3,193,533
POLYMERIZATION OF FORMALDEHYDE
Carl Harding Manwiller and John Brockway Thompson, Wilmington, Del., assignors to E. I. du Pont de Nemours and Company, Wilmington, Del., a corporation of Delaware
Filed Aug. 28, 1962, Ser. No. 219,858
10 Claims. (Cl. 260—67)

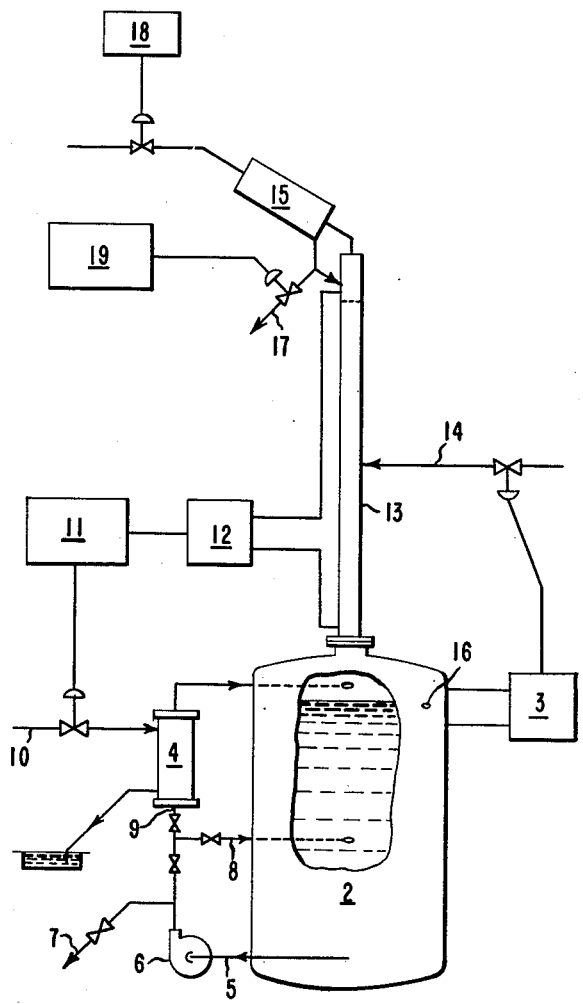
INVENTORS
CARL HARDING MANWILLER
JOHN BROCKWAY THOMPSON
BY *Samuel S. Blight*
AGENT 
United States Patent Office 3,193,533
Patented July 6, 1965

This invention relates to the concentration of formaldehyde solutions, and, more particularly, to a method for controlling the concentration of formaldehyde in a solution while the formaldehyde is being polymerized in the solution. This application is a continuation-in-part of copending application Serial Number 77,499, filed on December 22, 1960, now Patent No. 3,128,313 by Carl Harding Manwiller and John Brockway Thompson.

Formaldehyde is generally produced on a commercial basis by the air oxidation of methanol which gives a product containing mainly formaldehyde and water together with only minor amounts of unreacted methanol. Processes are known for removing water from such products and, thus, recovering a more highly concentrated formaldehyde. Little attention has been given, however, to processes for recovering concentrated formaldehyde from mixtures containing formaldehyde and methanol as main ingredients with little or no water present. Such mixtures are obtained by the catalytic dehydrogenation or partial oxidation of methanol as distinguished from straight air oxidation of methanol. Alcoholic formaldehyde solutions containing small amounts of water from paraformaldehyde are also obtained by the solution of formaldehyde or paraformaldehyde in an alcohol.

The prior art processes for the concentration of formaldehyde as a source of producing concentrated formaldehyde primarily relate to the treatment of aqueous solutions obtained from the air oxidation of methanol. Methanol solutions of formaldehyde as a source of producing concentrated formaldehyde have heretofore been of minor commercial importance. In research work precursing the present invention, it was found that almost pure methanol could be distilled out of the methanol-formaldehyde mixture at atmospheric pressure until the composition remaining in the stillpot mixture was about 65% formaldehyde. Increasing difficulty was encountered, however, in making an effective separation when further concentration of the formaldehyde was attempted. Larger amounts of formaldehyde tended to distill overhead with the methanol, and the methanol recovery system became fouled with formaldehyde polymer. Similar contamination of the alcoholic distillate occurs in solutions of formaldehyde in other alcohols such as propanol, n-butanol, etc. In view of the utility of concentrated formaldehyde solutions, wherein the concentration of the formaldehyde is from 70 to 90% and higher, in such applications as the polymerization of formaldehyde to high molecular weight, polyoxymethylene resins, an economic process for the preparation of such solutions is highly desirable.

In the polymerization of formaldehyde in hydroxylic medium, the extent of supersaturation of the medium with formaldehyde must be controlled rather closely since it determines the relative rate of polymer growth, the rate of nucleation, and affects the molecular weight and molecular weight distribution of the polymer. A previous method for controlling the concentration of formaldehyde in a polymerization medium usually involved the direct addition of monomeric formaldehyde to the polymerization medium as shown in United States Patent 2,768,994, issued to R. N. MacDonald on October 30, 1956. The monomeric formaldehyde also required careful preparation as shown in United States Patent 2,848,500, issued to D. L. Funck on August 19, 1958. In addition to the various processing steps involved in the introduction of monomeric formaldehyde, a continuous analysis of formaldehyde concentration in the polymerization medium is necessary for adequate control of the reaction. All of the above factors add to the complexity and cost of the operation.

It is therefore an object of the present invention to provide a process for the concentration of formaldehyde solutions in alcohols and particularly in methanol. Still another object is to provide methanol solutions of better than 70% formaldehyde concentration. An additional object of the present invention is to provide a process to control the concentration of formaldehyde in a hydroxylic medium at a level of at least 60% by weight of formaldehyde and, preferably, at a level of 75 to 85% by weight of formaldehyde based upon the weight of the medium within ±0.5% and, preferably, within ±0.1% of a given formaldehyde concentration, thereby controlling the polymerization of formaldehyde in the medium. Still a further object of the present invention is to provide a process for the polymerization of fomraldehyde which may be easily regulated by controlling the boiling point of the reaction medium. Other objects of the present invention will be apparent hereinafter.

The above objects are accomplished by providing a process for controlling the concentration of formaldehyde in an alcohol solvent while polymerizing the formaldehyde to high molecular weight polyoxymethylene. The solution having a formaldehyde concentration of greater than about 50%, and usually about 60%, is introduced into a reaction zone along with a basic formaldehyde polymerization initiator. This reaction mixture is then heated to vaporize a portion of the solution, and by noting the vaporization temperature (boiling point) the concentration of formaldehyde may be determined. Solvent may then be withdrawn through a distillation apparatus to achieve the desired temperature in the reaction zone and to maintain that temperature while monomeric formaldehyde is consumed the polymerization. The distillation is conducted in the presence of a catalyst being a member selected from the class consisting of inorganic and organic bases having a $pK_b$ at 25° C. of greater than 5.15 and metal salts of acids having a $pK_a$ at 25° C. of greater than 3.00.

The polymerization of formaldehyde in a hydroxylic medium proceeds by a "crystallization type" mechanism with the degree of supersaturation of formaldehyde in the medium determining the growth rate, the rate of nucleation and the molecular weight and molecular weight distribution of the polymer. Analogous to a crystallization mechanism where high levels of supersaturation result in small crystal size and broad distribution of crystal sizes and where low levels of supersaturation result in large crystal size and narrow distribution of crystal sizes, the polymerization of formaldehyde in a hydroxylic medium under the former conditions yields a polymer of relatively low molecular weight and broad molecular weight distribution, while in the latter case the polymer is relatively high in molecular weight and possesses a narrow molecular weight distribution. Prior to the present invention, it was impractical to conduct this type of alcoholic polymerization at high formaldehyde concentrations due to the difficulty of controlling the formaldehyde concentration. As set forth hereinabove, monomeric formaldehyde was usually introduced into the polymerization medium. With the discovery of the hereindescribed distillation technique, it is now possible to control the formaldehyde concentration by commercially feasible methods.

It has been postulated that the formaldehyde, when dissolved in an alcohol, forms a hemiacetal containing one or more units of formaldehyde depending on the concentration of the formaldehyde. An alcohol solution, when liquid, contains substantially no free formaldehyde and the formaldehyde is believed to exist almost completely in the form of a hemiacetal. It will be apparent that the formation of the hemiacetal is in equilibrium with the dissociation of the hemiacetal back into the alcohol and formaldehyde. In dilute solution, the removal of alcohol has little effect on this equilibrium but, as the concentration of the hemiacetal is increased and the boiling temperature rises, the concentration of free formaldehyde will increase and also more hemiacetal will vaporize. In the vapor form, the described equilibrium is reversed so that substantially all of the hemiacetal dissociates into alcohol and formaldehyde. As a result, with increasing concentrations of formaldehyde, the distillate will contain higher and higher concentrations of formaldehyde making straight distillation as a means of further concentration unfeasible. In any distillation, and particularly in adiabatic distillations, a portion of the condensate which is formed in the distillation condenser is returned to the distilling liquid, and, therefore, a vapor-condensate mixture is always present in a distilling column. The presence of a base or a basic salt in the vapor-condensate zone of the distillation greatly reduces the concentration of the formaldehyde in the distillate. The explanation for this phenomenon is believed to be that the addition of a base catalyzes the formation of the hemiacetal from formaldehyde dissolving from the vapor phase into the condensate phase. As a result of the action of the catalyst, the dissolved formaldehyde is rapidly transformed into the hemiacetal, thus allowing more of the vaporized formaldehyde to dissolve in the condensate. The preferred catalysts for the distillation portion of the present invention are so efficient that substantially all of the formaldehyde released by the distilling solution is redissolved in the condensate dropping back into the distilling solution, so that the distillate contains only traces of formaldehyde or the hemiacetal and comprises mostly the alcohol. The foregoing explanation will also make it apparent why at higher reflux ratios improved results can be obtained with some of the less efficient catalysts.

The catalysts employed in the distillation process are, as indicated above, organic and inorganic bases having a $pK_b$ of greater than 5.15 and basic metal salts, i.e., generally metal salts of acids, having a $pK_a$ of greater than 3.0. By "base" is meant any compound which on contact with water will release or cause the release of hydroxyl ions. The term "pK" is defined as the negative logarithm of the dissociation constant measured at 25° C.; when applied to bases, it is calculated by the following formula $pK_b = 14.00 + \log K$, where K is the dissociation constant. There are, of course, bases and acids which dissociate in more than one step, the first step exhibiting a higher dissociation constant than any subsequent step. In the terms of this invention, it is only necessary for any one dissociation to meet the pK limits stated. The pK values and/or dissociation constants may be found in the International Critical Tables or other scientific publications for many of the basic compounds employed as catalysts in the present invention, and, for those not found in such publications, the methods of measuring the pK and/or the dissociation constant at 25° C. are well known to skilled chemists. The subscript letters $a$ and $b$ indicate the acidic or basic nature of the dissociation constant.

The basic catalysts employed in the distillation step in the invention may be basic compounds which are soluble in the alcohol formaldehyde solution and volatilize with the alcohol formaldehyde vapors in which case they are added to the distilling solution. They may be solids or liquids which boil above the stillpot temperature, soluble in the alcohol-formaldehyde solution, in which case the catalyst in solution form is continuously added to the column head, trickled through the column and recycled; they may be insoluble solids in which case they are placed in the column with the column packing. The term "soluble" includes all compounds soluble in at least catalytic concentration, which is the only important criterion of solubility in the process described. It will be apparent that the insoluble solid catalysts of the present invention will result in relatively poor catalysis, since the catalytic reaction is one occurring in the condensate phase. However, no matter which form the catalyst assumes, it is essential that the catalyst is present in the distillation column itself and not merely in the solution to be distilled. The metal salts employed in the present invention as catalysts are salts of weak organic acids, so that the overall effect of the addition of the salt to the system is that of a basic environment. The disadvantage of using metal salts is the ability of the acid formed on dissociation to cause undesirable side reactions. However, with the salts of the acids stated as suitable hereinabove, i.e., salts of acids having a $pK_a$ of greater than 3, these side reactions are greatly suppressed and do not significantly affect the operability of the process.

In view of the different forms the catalyst can assume, e.g., a volatile liquid, a non-volatile liquid, a soluble solid, an insoluble solid, including precipitates which may form on the column packing when solutions of metal salts are introduced, the concentration of the catalyst will vary widely. If the catalyst is dissolved in the condensate into which the vaporized formaldehyde is absorbed, the concentration will be in the range normal for catalysts, i.e., from 0.001 to 10 weight percent on the basis of the formaldehyde alcohol solution. Where the catalyst is in the form of an insoluble solid, the concentration can vary over an even greater range.

Specific examples of volatile catalysts are methylamine, ethylamine, n-butylamine, isobutylamine, n-hexylamine, cyclohexylamine, dimethylamine, diethylamine, di-n-butylamine, N-methyl-cyclohexylamine, trimethylamine, triethylamine, tri-n-propylamine, N,N'-dimethylcyclohexylamine, pyrrolidine, pyridine, 2-methyl pyridine, piperidine, N-ethylpiperidine, etc. Soluble non-volatile catalysts are sodium acetate, sodium propionate, potassium butyrate, magnesium diacetate, sodium tetraborate, sodium citrate, sodium formate, barium hydroxide, potassium hydroxide, aluminum acetate, chromium acetate, cobalt acetate, lead acetate, manganese acetate, zinc acetate, triethylenediamine, sodium hydroxide, etc. Solid catalysts are, in particular, basic ion exchange resins, such as polyamines and quaternary ammonium type of resins. The latter type, however, frequently are unsuitable in that their use temperatures are below the column temperatures employed in the process of the present invention. In addition, it was also found that alumina is a catalyst even though its catalytic activity is not high. The activity of alumina as a catalyst can be explained by the formation of basic aluminum formate on the surface of the alumina when contacted with the formaldehyde-alcohol solutions. The preferred catalysts employed in the distillation are organic amines. Tertiary amines are especially preferred because of their superior ability to cause the concentration of formaldehyde and because they do not enter into undesirable side reactions with formaldehyde which can occur when primary or secondary amines are employed.

Numerous alcohols may be employed in the present invention including, but not limited to, methanol, ethanol, n-propanol, isopropanol, etc. Many of the catalysts employed in the distillation portion of the present invention are also operable as polymerization catalysts with sodium hydroxide, sodium formate, and several of the tertiary amines being preferred for the polymerization reaction. United States Patent 3,000,860, issued to N. Brown et al. on September 19, 1961, also discloses catalysts and alcohols which are operable in the process of this invention.

The distillation portion of the process of the present invention is further illustrated by the data in the tables centration. Example 7 shows that a very high concentration of formaldehyde can be readily obtained.

*Table I*

| Examples | Catalyst | | Wt. percent HCHO in still-pot | Wt. percent HCHO in distillate | | | Base strength of catalyst, pK_b[1] |
|---|---|---|---|---|---|---|---|
| | Material | Conc. in still-pot, moles/liter | | 1:1 reflux ratio | 3:1 reflux ratio | 5:1 reflux ratio | |
| 1 | None | | 73 | 36.2 | 31.4 | 18.8 | |
| 2 | Triethylamine | 0.013 | 73 | 26.8 | 3.0 | <0.1 | 10.75 |
| 3 | N-ethyl piperidine | 0.033 | 73 | 34.2 | 3.3 | <0.2 | 10.41 |
| 4 | Tri-n-propylamine | 0.040 | 73 | | 4.8 | | 10.70 |
| 5 | do | 0.010 | 73 | | 14.1 | | 10.70 |
| 6 | Pyridine | 0.090 | 73 | 35.1 | 24.0, [2]17.6 | 12 | 5.15 |
| 7 | N-ethyl piperidine | 0.031 | 78.5 | | —, [2]3.0 | | 10.41 |

[1] pK_b = 14.00 + log K, where K is the dissociation constant.
[2] Reflux ratio 4:1.

given below. The data in these tables were obtained employing a column 20 mm. I.D., 40 cm. long, packed with ⅛" diameter glass helices. The boil-up rate was 3.0 ml./minute. Unless otherwise stated, all distillations were carried out at atmospheric pressure. Percentages, unless otherwise identified, indicate weight percent of the total composition involved. The boil-up rate and reflux ratio were set and controlled by the standard methods commonly used in distillation work. The tables show the composition of the distillate at certain concentrations of formaldehyde in the distilling solutions, as determined from samples taken during the distillation. The tables also show the composition of the distillate in the absence of the catalysts employed in the process and, thus, illustrate the activity of the basic catalysts employed in the process. The high quantities of formaldehyde obtained in the distillate in a straight distillation point out the uneconomic results obtained when it is attempted to concentrate methanol solutions of formaldehyde by distillation without the catalysts discovered. It is apparent from these data that, even with the catalysts employed, the concentration of formaldehyde in the distillate will increase with increasing concentrations of formaldehyde. However, the increase in concentration is substantially smaller when distillation catalysts are employed. The increase in the formaldehyde content of the distillate can also be reduced by increases in the reflux ratio or by carrying out the distillation at reduced pressure.

Examples 1 to 7 in Table I show the use of volatile basic catalysts added to the distilling solution. Example 6 shows the use of a catalyst having a borderline pK_b value. Examples 4 and 5 show the effect of base con- Table II shows results obtained with solid catalysts not soluble in the condensate. The "Dowex" 3 and "Amberlite" IR 45 are polyamine ion exchange resins containing primary, secondary and tertiary amine groups attached to a styrene divinyl benzene copolymer. In the distillation runs described in Table II, 10 g. of the resin-packing indicated was added to the packing of ⅛" diameter glass helices. Prior to use in the distillation experiments, the packed columns were treated with NaOH solution and washed according to the procedures recommended by the resin manufacturers to assure that the resins were in the basic form. In the case of alumina, the column was filled with ⅛" alumina spheres. The catalytic activity of alumina is explained by the formation of basic aluminum formate on the alumina.

*Table II*

| Example | Packing | Wt. percent HCHO in still-pot | Wt. percent HCHO in distillate (reflux ratio 3:1) |
|---|---|---|---|
| 8 | Glass (control) | 73 | 31.4 |
| 9 | "Dowex" 3 on glass | 72 | 15.9 |
| 10 | "Amberlite" IR 45 on glass | 72 | 25.8 |
| 11 | Alumina | 72 | 13.2 |

Table III shows the result obtained with non-volatile catalysts. The catalyst solutions, the strengths of which are indicated in the table, were fed into the system at the top of the column at a rate of 0.65 ml./min. In Example 12, only pure methanol was added to the column.

*Table III*

| Example | Catalyst feed stream | Catalyst concentration in feed to top of column, moles/liter | Wt. percent HCHO in still-pot | Wt. percent HCHO in distillate (reflux ratio 3:1) |
|---|---|---|---|---|
| 12 | None (pure MeOH) | 0 | 73 | 25.2 |
| 13 | Sodium acetate | 0.1 | 73 | 0.1 |
| 14 | Sodium tetraborate | 0.1 | 73 | <0.1 |
| 15 | Sodium citrate | 0.01 | 73 | 5.7 |
| 16 | Sodium formate | 0.1 | 73 | <0.1 |
| 17 | Barium hydroxide | 0.1 | 73 | 1.0 |
| 18 | Chromium acetate | 0.1 | 73 | 4.6 |
| 19 | Cobalt acetate | 0.1 | 73 | <0.1 |
| 20 | Lead acetate | 0.1 | 73 | <0.1 |
| 21 | Manganese acetate | 0.1 | 74 | 2.2 |
| 22 | Zinc acetate | 0.1 | 74 | 0.09 |
| 23 | Triethylene diamine [1] | 0.5 | 73 | 2.2 |
| 24 | Sodium hydroxide | 0.5 | 73 | 0.02 |
| 25 | do | 0.5 | 78.5 | 9.8 |
| 26 | Pure methanol-coated column.[2] | 0 | 73 | 3.9 |
| 27 | Pure methanol-coated column.[3] | 0 | 76 | 5.9 |

[1] pK_b values of K_1, 7.60 and K_2, 3.95.
[2] Column coated with residue deposited by cobalt acetate (Example 19).
[3] Column coated with residue deposited by barium hydroxide solution (Example 17).

Table IV shows in Example 28 the production of a 76% formaldehyde solution in methanol starting with a 52.7% solution. Examples 29 to 31 demonstrate the process of the present invention as applied to other alcohols. Table IV also shows in Examples 32 and 34 that the catalysts of the present invention are effective in the water distillation of formaldehyde, but that the catalysts are substantially more effective for the methanol distillation of formaldehyde.

center of the column 13 and its flow controlled by level control 3. The column is also equipped with a pressure control system beyond the condenser 15 of standard design. A temperature sensing device 16 controls the distillate draw-off through line 17.

A typical example of the process of the present invention is set forth below.

The reactor employed in this example was a cylindrical vessel approximately 34 inches in height having a diameter

*Table IV*

| Example | Solvent | Pressure, mm. Hg | Catalyst | Catalyst concentration in stillpot, moles/l | Wt. percent HCHO in pot | | Pot temperature in ° C. | | Wt. percent HCHO in distillate | Reflux ratio |
|---|---|---|---|---|---|---|---|---|---|---|
| | | | | | Initial | Final | Initial | Final | | |
| 28 | Methanol | 760 | N-ethyl piperidine | 0.02 | 52.7 | 76.6 | 95.1 | 109.4 | 4 to 10 | 0.5:1 to 4:1 |
| 29 | n-Butanol | 376 | Tri-n-propyl amine | 0.02 | 32.5 | | 105.1 | | 23 | 5:1 |
| 30 | Isopropanol | 758 | N-ethyl piperiine | 0.02 | 33.8 | 52.3 | 96.8 | 104.3 | 2.0 | 1:1 to 2:1 |
| 31 | n-Propanol | 762 | ___do___ | 0.02 | 52.2 | | 113.4 | | 19.9 | 4:1 |
| 32 | Water | 374 | None | | 39.6 | | 83.6 | | 15.1 | 3:1 |
| 33 | ___do___ | 374 | Triethyl amine | 0.06 | 40.0 | | 83.3 | | 13.9 | 3:1 |

Table V shows the simultaneous dehydration and concentration of a methanol-water-formaldehyde solution. In this run, the stillpot was charged initially with the indicated solution. The feed stream was added slowly and continuously to the midpoint of the column, and the distillate was withdrawn continuously. The product was allowed to accumulate in the stillpot and was recovered at the conclusion of the run. Of the water entering with the feed, only about ⅛ appeared in the dehydrated product.

Batchwise dehydrations were carried out on solutions containing less water than in the feed of the example shown in Table V. A methanol-formaldehyde solution was dehydrated from 0.85% water to 0.05 water. At the same time, the solution was concentrated from 53 to 77% formaldehyde. Similarly, an isopropanol-formaldehyde solution was dehydrated from 0.33% to 0.020% water, while the formaldehyde concentration increased from 34 to 52%. Both runs were made at one atmospheric pressure with N-ethyl piperidine as the catalyst.

of 22 inches and a capacity of 50 gallons. The upper portion of the reactor was equipped with a one inch line for the introduction of a vapor liquid stream from the heat exchanger 4, and was equipped with a conductivity probe to control the level of the liquid in the reactor between 30 and 31 inches in height. The top of the aforementioned cylindrical vessel was equipped with 2½ inch flange to which was attached a cylindrical column of 60 inches in height having a packing of Rashig rings which approximately correspond to 6 theoretical plates. At midway in the aforementioned column, a provision was made for a 44 inch inlet line for the introduction of a solution of formaldehyde and methanol containing 60% formaldehyde. The flow through this line (line 14) was controlled by an automatic valve connected to level control 3. Suitable taps were provided in the head and base of the aforementioned column for the connection of a standard differential pressure device which, in turn, controlled the steam emitted to heat exchanger 4 through a ½ inch valve. The head of the column was provided

*Table V*

| Component | Initial charge | | Feed stream | | Distillate | | Product recovered from stillpot | | Net gain or (loss) | | Gain (loss) to side reaction [1] | | Gain (loss) not accounted for, grams |
|---|---|---|---|---|---|---|---|---|---|---|---|---|---|
| | Wt. percent | Wt., g. | Wt. percent | Wt., g. | Wt. percent | Wt., g. | Wt. percent | Wt., g. | Grams | Moles | Grams | Moles | |
| Formaldehyde | 59.7 | 266.3 | 44.6 | 102.6 | 10.0 | 22.6 | 72.3 | 304.4 | (41.9) | (1.4) | (41.9) | (1.4) | 0 |
| Water | 0.11 | 0.5 | 28.5 | 65.5 | 19.67 | 44.4 | 2.03 | 8.6 | (13.0) | (0.72) | (8.5) | (0.47) | (4.5) |
| Methanol | 39.19 | 174.7 | 25.2 | 58.0 | 68.57 | 155.0 | 25.01 | 105.3 | 27.6 | 0.86 | 29.7 | 0.93 | (2.1) |
| Formic acid | 0.1 | 0 | 0.14 | 0.3 | 0.41 | 0.9 | 0.06 | 0.2 | 0.8 | 0.017 | 0 | 0 | 0.8 |
| Triethylamine | 1.0 | 4.5 | 1.56 | 3.6 | 1.35 | 3.1 | 0.60 | 2.5 | (2.5) | | 0 | 0 | (2.5) |
| Carbon dioxide | | | | | | | | | | | 20.7 | 0.47 | |
| Total | | 446 | | 230 | | 226 | | 421 | (29) | | 0 | | (8.3) |

[1] Side reaction $3HCHO + H_2O \longrightarrow 2CH_3OH + CO_2$. Side reaction calculations are based on formaldehyde balance.

The following description and examples illustrate an embodiment of the present invention. FIGURE I, attached hereto and made a part of this specification, is a schematic diagram of a typical apparatus employed in the practice of the present invention. The reaction is carried out in a cylindrical vessel 2 which is equipped with a level control 3, a heat exchanger 4, and a circulating system consisting of a tangentially disposed draw-off line 5, a circulating pump 6, a slurry draw-off line 7, and a tangentially disposed return line 8. A portion of the circulating slurry is fed to the heat exchanger 4 through line 9 which slurry is heated by application of steam (line 10) controlled by the meter 11 and the differential pressure gage 12, thereby maintaining a constant boilup in packed column 13. An alcoholic solution of formaldehyde (line 14) is introduced approximately in the with a 2½ inch vapor exit line to a standard type of shell and tube condenser sized to accommodate a boil-up of approximately 10 pounds/hour. A 1½ inch return line from the base of the condenser to the head of the column along with a draw-off line controlled by an automatic valve was provided. Pressure was controlled at the head of the condenser. The draw off from the column was controlled by automatic valve 17 which was actuated by changes in temperature of the boiling material in the cylindrical vessel as sensed by a thermistor placed below the liquid interface. In this particular run, the pressure on the system is set at 15.6 p.s.i.a. and 60% formaldehyde solution and methanol was introduced through line 14 until level controller 3 caused the valve in line 14 to close. At this point, recirculating pump 6 was energized to provide flow through line 5 at a rate of approximately 6000 pounds/hour, and steam was introduced to the jacket of heat exchanger 4 and set to maintain a differential pressure in the packed column of approximately 20 millimeters of mercury. The temperature of the vapor exit heat exchanger 4 was 115° C. After approximately five minutes on total reflux, the distillation had leveled out and the vapor temperature at the top of the column was approximately 65° C. The control mechanism for the automatic valve on the distillate exhaust line was set to maintain a temperature in the reactor of 110.0° C., whereupon the distillate control valve opened and approximately 12 pounds/hour of a 95% methanol solution was removed from the column. As the methanol was removed overhead, the level controller 3 actuated the automatic valve in line 14 to admit additional amounts of 60% formaldehyde, thereby holding the level in the polymerizer at the desired point. After the aforementioned polymerization temperature was reached, controller 19 closed valve 17 and a distillation proceeded on total reflux.

The polymerization itself is started by providing "seed polymer." The seeding is accomplished by rapidly cooling the contents of the vessel to about 70° C. at which time seed polymer is formed by spontaneous nucleation. The cooling may be accomplished by reducing the pressure on the system, thereby reducing the boiling point of the mixture, or by removing a small part of the liquid in the vessel through line 7, cooling the material thus removed to produce seed polymer and returning the material back through the line. In this example, the latter procedure was followed. After seeding, the polymerization continued at a steady state determined by the pressure and temperature. Formaldehyde was consumed at the rate of about 5 pounds/hour by growth of the seed polymer. Methanol was removed at a rate of about 2 pounds/hour as distillate to maintain the formaldehyde concentration at a constant level. When the molecular weight of the polymer reached approximately 35,000, the run was terminated by discharging the slurry through line 7 to a filter tank where the slurry was diluted with methanol in preparation for filtration. Approximately 120 pounds of polymer were recovered from the run.

From the foregoing description, it should be obvious to one skilled in the art that the described process may be also operated in a continuous manner with proper regulation of the slurry drawoff through line 7. Since the process of the present invention may be controlled within narrow limits, this process should find widespread application in the production of high molecular weight acetal resin, which, in turn, may be molded or extruded into a variety of shapes for the production of gears, films, fibers, and like materials.

We claim:

1. A process for controlling the concentration of formaldehyde during the polymerization of formaldehyde to high molecular weight polyoxymethylene which comprises introducing a solution of formaldehyde in an alcohol solvent into a reaction zone in the presence of a basic formaldehyde polymerization initiator, vaporizing a portion of said solution, measuring the vaporization temperature and pressure, and withdrawing a portion of said solvent through a distillation apparatus to maintain the boiling point and pressure of said solution at a point corresponding to the desired concentration of formaldehyde in the solution, said distillation being conducted in the presence of a distillation catalyst being a compound selected from the class consisting of inorganic and organic bases having a $pK_b$ at 25° C. of greater than 5.15 and metal salts of acids having a $pK_a$ at 25° C. of greater than 3.

2. The process of claim 1 wherein the alcohol is methanol.

3. The process of claim 1 wherein the solution consists essentially of 75 to 85 percent by weight based upon the solution of formaldehyde.

4. The process of claim 3 wherein the solution contains up to 5.0 percent by weight of water based upon the solution.

5. The process of claim 3 wherein the solution contains 0.09 to 0.11 percent by weight of water based upon the solution.

6. The process of claim 5 wherein the formaldehyde polymerization initiator is sodium hydroxide.

7. The process of claim 5 wherein the formaldehyde polymerization initiator is a soluble salt of sodium and an acid having a $pK_a$ of greater than 3.

8. The process of claim 6 wherein the distillation catalyst is a tertiary amine.

9. A process for controlling the concentration of formaldehyde during the polymerization of formaldehyde to high molecular weight polyoxymethylene which comprises continuously introducing a solution of formaldehyde in methanol into a reactor zone, continuously adding a formaldehyde polymerization initiator, continuously vaporizing a portion of said solution, measuring the vaporization temperature and pressure, and withdrawing a portion of said methanol through a distillation apparatus to maintain the boiling point and pressure of said solution corresponding to a formaldehyde concentration of 75 to 85 percent by weight based upon the said methanol, said distillation being conducted in the presence of a compound selected from the class consisting of inorganic and organic bases having a $pK_b$ at 25° C. of greater than 5.15 and metal salts having a $pK_a$ at 25° C. of greater than 3.0.

10. In a process for the polymerization of formaldehyde to high molecular weight polyoxymethylene which comprises introducing a solution of formaldehyde in an alcohol solvent into a reaction zone in the presence of a basic formaldehyde polymerization initiator, the improvement which comprises controlling the concentration of formaldehyde in the solution by vaporizing a portion of the solution to determine the concentration of the formaldehyde, and thereafter removing a portion of the solvent by distillation of the solvent from the solution in the presence of a distillation catalyst; said distillation catalyst being selected from the class consisting of inorganic and organic bases having a $pK_b$ at 25° C. of greater than 5.15 and metal salts of acid having a $pK_a$ at 25° C. of greater than 3.

References Cited by the Examiner
UNITED STATES PATENTS

| | | | |
|---|---|---|---|
| 2,153,526 | 4/39 | Walker | 260—67 |
| 2,537,169 | 1/51 | Stautzenberger et al. | 260—606 |
| 2,551,365 | 5/51 | Craven | 260—67 |
| 2,675,765 | 4/54 | MacLean | 260—606 |
| 2,704,765 | 3/55 | Smithson | 260—67 |

WILLIAM H. SHORT, *Primary Examiner.*

UNITED STATES PATENT OFFICE
CERTIFICATE OF CORRECTION

Patent No. 3,193,533                            July 6, 1965

Carl Harding Manwiller et al.

It is hereby certified that error appears in the above numbered patent requiring correction and that the said Letters Patent should read as corrected below.

Column 2, line 22, for "fomraldehyde" read -- formaldehyde --; line 40, after "consumed" insert -- in --; column 6, Table III, last column, line 2 thereof, for "0.1" read -- <0.1 --; columns 7 and 8, Table IV, fourth column, line 3 thereof, for "piperiine" read -- piperidine --; column 7, line 36, for "0.05" read -- 0.05% --; column 10, line 63, for "2,675,765" read -- 2,675,346 --.

Signed and sealed this 25th day of January 1966.

(SEAL)
Attest:

ERNEST W. SWIDER                           EDWARD J. BRENNER
Attesting Officer                              Commissioner of Patents